United States Patent
Noda et al.

[11] Patent Number: 5,899,086
[45] Date of Patent: May 4, 1999

[54] HEAT PUMP TYPE AIR CONDITIONING SYSTEM FOR AUTOMOTIVE VEHICLE

[75] Inventors: Yoshitoshi Noda; Hiroyuki Yamaguchi; Toshio Ohashi; Tadayoshi Tajima; Kaoru Kamiyama, all of Tochigi, Japan

[73] Assignee: Calsonic Corporation, Tokyo, Japan

[21] Appl. No.: 08/961,254

[22] Filed: Oct. 30, 1997

[51] Int. Cl.⁶ .............................. B60H 1/32; B60H 3/00; F25B 27/00

[52] U.S. Cl. .......................... 62/244; 62/323.1; 62/238.7; 165/42

[58] Field of Search .......................... 62/239, 244, 323.1, 62/324.1, 238.6, 238.7; 165/42, 43

[56] References Cited

U.S. PATENT DOCUMENTS

| | | | |
|---|---|---|---|
| 4,949,553 | 8/1990 | Suzuki | 62/238.7 |
| 5,020,320 | 6/1991 | Talbert et al. | 62/238.7 |
| 5,291,941 | 3/1994 | Enomoto et al. | 165/62 |
| 5,499,511 | 3/1996 | Hara et al. | 62/180 |
| 5,531,264 | 7/1996 | Eike et al. | 165/43 |
| 5,549,153 | 8/1996 | Baruschke et al. | 165/42 |
| 5,641,016 | 6/1997 | Isaji et al. | 165/43 |

FOREIGN PATENT DOCUMENTS

| | | |
|---|---|---|
| 2-500677 | 3/1990 | Japan . |
| 5-201243 | 8/1993 | Japan . |
| 7-101227 | 4/1995 | Japan . |
| 7-132728 | 5/1995 | Japan . |
| 8-295117 | 11/1996 | Japan . |
| 9-109669 | 4/1997 | Japan . |

Primary Examiner—William Doerrler
Attorney, Agent, or Firm—Foley & Lardner

[57] ABSTRACT

A heat pump type air conditioning system (A) for air-conditioning a passenger compartment of an automotive vehicle. The air conditioning system comprises first and second units (10, 20). The first unit includes a heater core (12) and a first evaporator (13) while the second unit includes a second condenser (22) and a second evaporator (23). A compressor (2) and a first condenser (3) are disposed outside the first and second units which constitute a refrigeration cycle including the first evaporator (13). A circuit change-over valve (4) is provided to cause flow of the refrigerant discharged from the compressor (2) to be changed over between a refrigeration operation refrigerant circuit including the first condenser and a heating operation refrigerant circuit including a bypass passage for allowing the refrigerant to flow bypassing the first condenser. A third evaporator (30) is disposed outside the first and second units (10, 20). A flow control valve (31) is provided to control a flow amount of the engine coolant circulating through the third evaporator (30) in accordance with a thermal load condition of the vehicle under control of an opening degree of the flow control valve, during the heating operation of the air conditioning system. The flow control valve (31) is set to take its fully closed state to prevent the engine coolant from circulating through the third evaporator (30) when a discharge pressure of the compressor (2) rises to a level not lower a first set value which is lower than a standard value to stop an operation of the compressor, and to take its fully opened state to allow the engine coolant to circulate through the third evaporator (30) when the discharge pressure of the compressor (2) lowers to a level not higher than a second set value which is lower than the first set value.

7 Claims, 6 Drawing Sheets

DURING HEATING OPERATION

DURING REFRIGERATION OPERATION

IN HOT WATER STABLE-TEMP. STATE

HEAT PUMP TYPE AIR CONDITIONING SYSTEM FOR AUTOMOTIVE VEHICLE

BACKGROUND OF THE INVENTION

1. Field of the Invention

This invention relates to improvements in a heat pump type air conditioning system for an automotive vehicle in which a passenger compartment can be heated and refrigerated under the action of engine coolant and refrigerant, and more particularly to the improvements to prevent a compressor from its damage upon an excessive rise in discharge pressure.

2. Description of the Prior Art

In recent years, a part of high quality cars and so-called one box-type cars having a relatively large space of a passenger compartment have been equipped with an automotive air conditioning system of a so-called dual air conditioning type including a front unit for air-conditioning a front region (for example, a front seat part) of the passenger compartment and a rear unit for air-conditioning a rear region (for example, a rear seat part) of the passenger compartment. Accordingly, the front and rear regions of the passenger compartment can be independently air-conditioned so as to achieve a comfortable air conditioning for the passenger compartment.

A typical example of the automotive air conditioning systems of such a type is arranged as follows: During the heating operation of the air conditioning system, the front unit uses engine coolant as a heat source while the rear unit uses as a heat source a high temperature and pressure refrigerant which is compressed by a compressor. Such an air conditioning system is arranged to pump up heat from the low temperature outside air in the circulating process or refrigeration cycle of the refrigerant and uses it to heat the passenger compartment. Accordingly, this air conditioning system is called a "heat pump type air conditioning system".

However, drawbacks have encountered in such air conditioning system in case of carrying out the heating operation of the passenger compartment of the automotive vehicle. For example, when the temperature of the outside air is low, for example, in the morning in winter, the temperature of the engine coolant is low at the engine starting, and the temperature rise of the refrigerant is not sharp. Consequently, it is difficult to put the air conditioning system into such a state as to blow warm air into the passenger compartment simultaneously with the starting of operation of the air conditioning system, so that the air conditioning system is low in quick or instant heating ability and is low in heating performance. Particularly in the one-box type cars which are provided with a diesel engine and are large in space of the passenger compartment, the rate of temperature rise of the engine coolant is low as compared with automotive vehicles provided with a usual gasoline engine while it is required to heat the large space, so there is such a tendency as to be low in quick heating ability and heating performance for the passenger compartment.

In view of this, a heat pump type air conditioning system of the following type has now been proposed: The refrigerant is heated under the action of heat of the coolant for a driving system in an electric vehicle, thereby to be increased in enthalpy and becoming high in temperature. Accordingly, the thus heated refrigerant exhibits a high heating ability of the air conditioning system. Such a heat pump type air conditioning system is disclosed in Japanese Patent Provisional Publication No. 7-101227.

It is usual to carry out an on-off control of the compressor in accordance with the discharge pressure of the compressor in order to protect the compressor from its breakage when the discharge pressure of the compressor excessively rises. It will be understood that it is a matter of course that the heat pump type air conditioning system of the above type should employ the on-off control of the compressor to protect the compressor at the excessive rise in discharge pressure of the compressor.

However, in case of protecting the compressor only under the on-off control of the compressor, shock (impact) and noise are generated with the on-off control (for example, the on-off action of a magnetic clutch) of the compressor, thereby lowering the drivability of the vehicle. Additionally, when the compressor is switched OFF, the circulation of the refrigerant is stopped so that the refrigeration cycle does not function. Consequently, for example, during the heating operation of the air conditioning system, cool air is unavoidably blown into the passenger compartment immediately when the compressor is switched OFF, thereby degrading the comfortableness of the air conditioning. Particularly in the above heat pump type air conditioning system, an unusual feeling on the part of the passenger is considerable when the cool air is suddenly blown, on the contrary to the fact that the air conditioning system inherently exhibits a high heating performance. As a result, it is desired to suppress the temperature change of the air blown into the passenger compartment to such a small extent as not to degrade the comfortableness of the passenger.

BRIEF SUMMARY OF THE INVENTION

It is an object of the present invention to provide a heat pump type air conditioning system for an automotive vehicle, which can effectively overcome drawbacks encountered in conventional heat pump type air conditioning systems for an automotive vehicle.

Another object of the present invention is to provide an improved air conditioning system for an automotive vehicle, which can meet both protection of a compressor and comfortableness of air conditioning for a passenger compartment, improving the drivability of the vehicle.

A further object of the present invention to provide an improved heat pump type air conditioning system for an automotive vehicle, in which the frequency of the on-off actions in an on-off control of a compressor can be lowered, thereby reducing shock and noise during operation of the air conditioning system.

A first aspect of the present invention resides in a heat pump type air conditioning system (A) for an automotive vehicle, which comprises first and second units (10, 20) which respectively have first and second air flow passages (11, 21) through which air taken in is introduced to a passenger compartment of the vehicle. The first unit includes a heater core (12) and a first evaporator (13) which are disposed in the first air flow passage and located such that the heater core is at the downstream side of the first evaporator relative to flow of air in the first air passage, an engine coolant being able to circulate through the heater core. The second unit includes a second condenser (22) and a second evaporator (23) which are disposed in the second air flow passage and located such that the second condenser is at the downstream side of the second evaporator relative to flow of air in the second air passage. The second condenser (22) and the second evaporator (23) are fluidly connected in parallel with the first evaporator (13) and fluidly connected in series with each other. A compressor (2) and a first condenser (3) are disposed outside the first and second units which constitute a refrigeration cycle including the first evaporator (13). A refrigeration operation refrigerant circuit is provided to accomplish a refrigeration operation of the air conditioning system, the refrigeration operation refrigerant circuit including the first condenser (3). A heating operation refrigerant circuit is provided to accomplish a heating operation of the air conditioning system, the heating operation refrigerant circuit including a bypass passage (6) for allowing the refrigerant to flow bypassing the first condenser. A circuit change-over valve (4) is provided to cause flow of the refrigerant discharged from the compressor (2) to be changed over between the refrigeration operation refrigerant circuit and the heating operation refrigerant circuit. A third evaporator (30) is disposed outside the first and second units (10, 20) and fluidly connected to a fluid outlet of the second evaporator (23). The engine coolant is able to circulate through the third evaporator. The refrigerant to be returned to the compressor (2) is heated with the engine coolant in the third evaporator (30). A control device (31, 16, 4) is provided to control flow of one of the engine coolant and the refrigerant in accordance with a thermal load condition of the vehicle, during the heating operation of the air conditioning system. The device is capable of controlling the flow of one of the engine coolant and the refrigerant in accordance with a discharge pressure of the compressor (2).

A second aspect of the present invention resides in a heat pump type air conditioning system (A) for an automotive vehicle, which comprises first and second units (10, 20) which respectively have first and second air flow passages (11, 21) through which air taken in is introduced to a passenger compartment of the vehicle. The first unit includes a heater core (12) and a first evaporator (13) which are disposed in the first air flow passage and located such that the heater core is at the downstream side of the first evaporator relative to flow of air in the first air passage, an engine coolant being able to circulate through the heater core. The second unit includes a second condenser (22) and a second evaporator (23) which are disposed in the second air flow passage and located such that the second condenser is at the downstream side of the second evaporator relative to flow of air in the second air passage. The second condenser (22) and the second evaporator (23) are fluidly connected in parallel with the first evaporator (13) and fluidly connected in series with each other. A compressor (2) and a first condenser (3) are disposed outside the first and second units which constitute a refrigeration cycle including the first evaporator (13). A refrigeration operation refrigerant circuit is provided to accomplish a refrigeration operation of the air conditioning system, the refrigeration operation refrigerant circuit including the first condenser (3). A heating operation refrigerant circuit is provided to accomplish a heating operation of the air conditioning system, the heating operation refrigerant circuit including a bypass passage (6) for allowing the refrigerant to flow bypassing the first condenser. A circuit change-over valve (4) is provided to cause flow of the refrigerant discharged from the compressor (2) to be changed over between the refrigeration operation refrigerant circuit and the heating operation refrigerant circuit. A third evaporator (30) is disposed outside the first and second units (10, 20) and fluidly connected to a fluid outlet of the second evaporator (23). The engine coolant is able to circulate through the third evaporator. The refrigerant to be returned to the compressor (2) is heated with the engine coolant in the third evaporator (30). A flow control valve (31) is provided to control a flow amount of the engine coolant circulating through the third evaporator (30) in accordance with a thermal load condition of the vehicle under control of an opening degree of the flow control valve, during the heating operation of the air conditioning system.

According to this aspect of the present invention, by virtue of the flow control valve, during the heating operation of the air conditioning system, the flow amount of the engine coolant circulating through the third evaporator (30) is controlled in accordance with the thermal load condition of the vehicle. This can control the flow amount of the engine coolant to be flown into the third evaporator, i.e., the amount of heat transferred from the engine coolant to the refrigerant. As a result, the air conditioning system can exhibit a delicate heating performance precisely in accordance with the thermal load condition of the vehicle.

The flow control valve (31) of the air conditioning system of the first aspect preferably set to take its fully closed state to prevent the engine coolant from circulating through the third evaporator (30) when a discharge pressure of the compressor (2) rises to a level not lower than a first set value which is lower than a standard value to stop an operation of the compressor, and to take its fully opened state to allow the engine coolant to circulate through the third evaporator (30) when the discharge pressure of the compressor (2) lowers to a level not higher than a second set value which is lower than the first set value.

With this flow control valve (31), during the heating operation of the air conditioning system, when the discharge pressure of the compressor rises to the first set value (<the standard value) or higher, the flow control valve is fully closed. By this, no engine coolant flows to the third evaporator and therefore the third evaporator can not function. Accordingly, the temperature of the refrigerant to be sucked into the compressor lowers so that the discharge pressure of the compressor lowers. When the discharge pressure of the compressor lowers the second set value (<the first set value) or lower, the flow control valve is again fully opened. By this, the third evaporator again starts to function so that the discharge pressure of the compressor rises. In case that the first and second set values are suitably selected, the compressor can be effectively protected from its breakage, minimizing the temperature change of the air blown through the vents (i.e., without degrading comfortableness of air conditioning) by repeating the above controls. Additionally, since the on-off control of the flow control valve is accomplished at the stage before the stopping the operation of the compressor, the frequency of the on-off actions in the on-off control of the compressor can be decreased, thereby improving the drivability of the vehicle. Furthermore, dual protecting means for the compressor are provided to cope with a pressure rise of the compressor, thereby improving the reliability of the air conditioning system.

A third aspect of the present invention resides in a heat pump type air conditioning system (A) for an automotive vehicle, which comprises first and second units (10, 20) which respectively have first and second air flow passages (11, 21) through which air taken in is introduced to a passenger compartment of the vehicle. The first unit includes a heater core (12) and a first evaporator (13) which are disposed in the first air flow passage and located such that the heater core is at the downstream side of the first evaporator relative to flow of air in the first air passage, an engine coolant being able to circulate through the heater core. The second unit includes a second condenser (22) and a second evaporator (23) which are disposed in the second air flow passage and located such that the second condenser is at the downstream side of the second evaporator relative to flow of air in the second air passage. The second condenser (22) and the second evaporator (23) are fluidly connected in parallel with the first evaporator (13) and fluidly connected in series with each other. A compressor (2)

and a first condenser (3) are disposed outside the first and second units which constitute a refrigeration cycle including the first evaporator (13). A refrigeration operation refrigerant circuit is provided to accomplish a refrigeration operation of the air conditioning system, the refrigeration operation refrigerant circuit including the first condenser (3). A heating operation refrigerant circuit is provided to accomplish a heating operation of the air conditioning system, the heating operation refrigerant circuit including a bypass passage (6) for allowing the refrigerant to flow bypassing the first condenser. A circuit change-over valve (4) is provided to cause flow of the refrigerant discharged from the compressor (2) to be changed over between the refrigeration operation refrigerant circuit and the heating operation refrigerant circuit. A third evaporator (30) is disposed outside the first and second units (10, 20) and fluidly connected to a fluid outlet of the second evaporator (23). The engine coolant is able to circulate through the third evaporator. The refrigerant to be returned to the compressor (2) is heated with the engine coolant in the third evaporator (30). A flow control valve (16) is provided to control a flow amount of the refrigerant to be introduced to the first evaporator (13). The flow control valve (16) is set to take its opened state to allow the refrigerant to be introduced to the first evaporator (13) when a discharge pressure of the compressor (2) rises to a level not lower than a third set value which is lower than a standard value to stop an operation of the compressor, and to take its closed state to prevent the refrigerant from being introduced to the first evaporator (13) when the discharge pressure of the compressor (2) lowers to a level not higher than a fourth set value which is lower than the third set value, during the heating operation of the air conditioning system.

According to this aspect of the present invention, during the heating operation of the air conditioning system, when the discharge pressure of the compressor rises to the third set value (<the standard value) or higher, the flow control valve is opened to allow the refrigerant to flow also to the first evaporator. By this, the discharge pressure of the compressor lowers, thereby protecting the compressor from its breakage. When the discharge pressure of the compressor lowers to the fourth set value (<the third set value) or lower, the flow control valve is again closed to prevent the refrigerant from flowing into the first evaporator, thereby again functioning the refrigerant circuit for the normal heating operation of the air conditioning system. Additionally, since the on-off control of the flow control valve is accomplished at the stage before the stopping the operation of the compressor, the frequency of the on-off actions in the on-off control of the compressor can be decreased, thereby improving the drivability of the vehicle. Furthermore, dual protecting means for the compressor are provided to cope with a pressure rise of the compressor, thereby improving the reliability of the air conditioning system.

A fourth aspect of the present invention resides in a heat pump type air conditioning system (A) for an automotive vehicle, which comprises first and second units (10, 20) which respectively have first and second air flow passages (11, 21) through which air taken in is introduced to a passenger compartment of the vehicle. The first unit includes a heater core (12) and a first evaporator (13) which are disposed in the first air flow passage and located such that the heater core is at the downstream side of the first evaporator relative to flow of air in the first air passage, an engine coolant being able to circulate through the heater core. The second unit includes a second condenser (22) and a second evaporator (23) which are disposed in the second air flow passage and located such that the second condenser is at the downstream side of the second evaporator relative to flow of air in the second air passage. The second condenser (22) and the second evaporator (23) are fluidly connected in parallel with the first evaporator (13) and fluidly connected in series with each other. A compressor (2) and a first condenser (3) are disposed outside the first and second units which constitute a refrigeration cycle including the first evaporator (13). A refrigeration operation refrigerant circuit is provided to accomplish a refrigeration operation of the air conditioning system, the refrigeration operation refrigerant circuit including the first condenser (3). A heating operation refrigerant circuit is provided to accomplish a heating operation of the air conditioning system, the heating operation refrigerant circuit including a bypass passage (6) for allowing the refrigerant to flow bypassing the first condenser. A circuit change-over valve (4) is provided to cause flow of the refrigerant discharged from the compressor (2) to be changed over between the refrigeration operation refrigerant circuit and the heating operation refrigerant circuit. A third evaporator (30) is disposed outside the first and second units (10, 20) and fluidly connected to a fluid outlet of the second evaporator (23). The engine coolant is able to circulate through the third evaporator. The refrigerant to be returned to the compressor (2) is heated with the engine coolant in the third evaporator (30). In this air conditioning system, the circuit change-over valve (4) is set to take its first position to cause the flow of the refrigerant discharged from the compressor (2) to be changed over to the refrigeration operation refrigerant circuit when a discharge pressure of the compressor (2) rises to a level not lower than a fifth set value which is lower than a standard value to stop an operation of the compressor, and to take its second position to cause the flow of the refrigerant discharged from the compressor (2) to be changed over to the heating operation refrigerant circuit when the discharge pressure of the compressor (2) lowers to a level not higher than a sixth set value which is lower than the fifth set value, during the heating operation of the air conditioning system.

According to this aspect of the present invention, when the discharge pressure of the compressor rises to the fifth set value (<the standard value) or higher, the circuit change-over valve is changed over to select the refrigerant circuit for the refrigeration operation. By this, the refrigerant flows to the first condenser disposed outside the first and second units, so that the discharge pressure of the compressor is lowered, thereby protecting the compressor from its breakage. When the discharge pressure of the compressor lowers to the sixth set value (<the fifth set value) or lower, the circuit change-over valve is changed over to select the refrigerant circuit for the heating operation, thereby again functioning the refrigerant circuit for the normal heating operation. Additionally, since the on-off control of the flow control valve is accomplished at the stage before the stopping the operation of the compressor, the frequency of the on-off actions in the on-off control of the compressor can be decreased, thereby improving the drivability of the vehicle. Furthermore, dual protecting means are provided to cope with a pressure rise of the compressor, thereby improving the reliability of the air conditioning system.

BRIEF DESCRIPTION OF THE DRAWINGS

In the drawings, same reference numerals designate same parts and elements throughout all figures, in which.

DETAILED DESCRIPTION OF THE INVENTION

Figure 1:
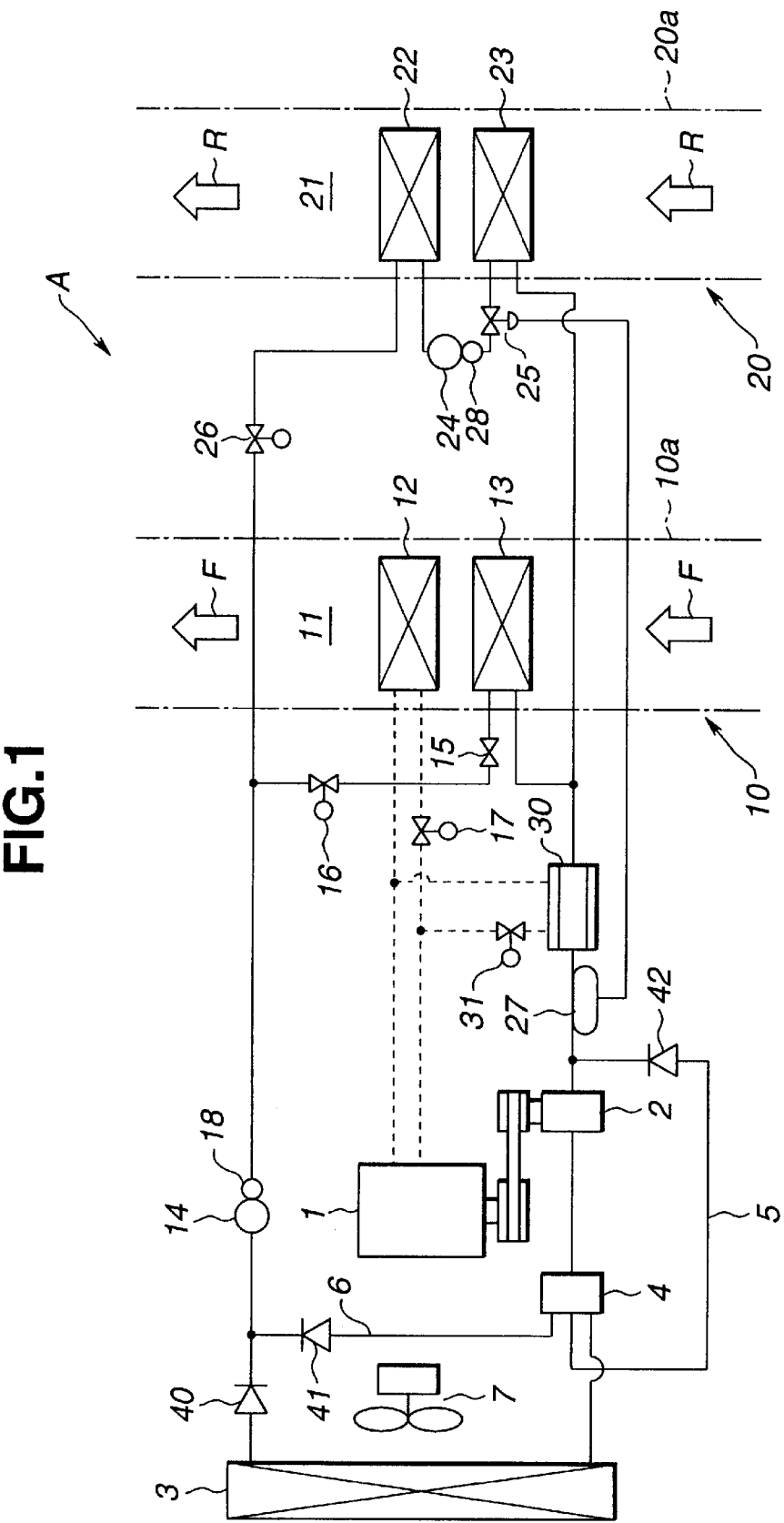
FIG. 1 is a schematic illustration of an embodiment of a heat pump type air conditioning system according to the present invention.
Figure 2:
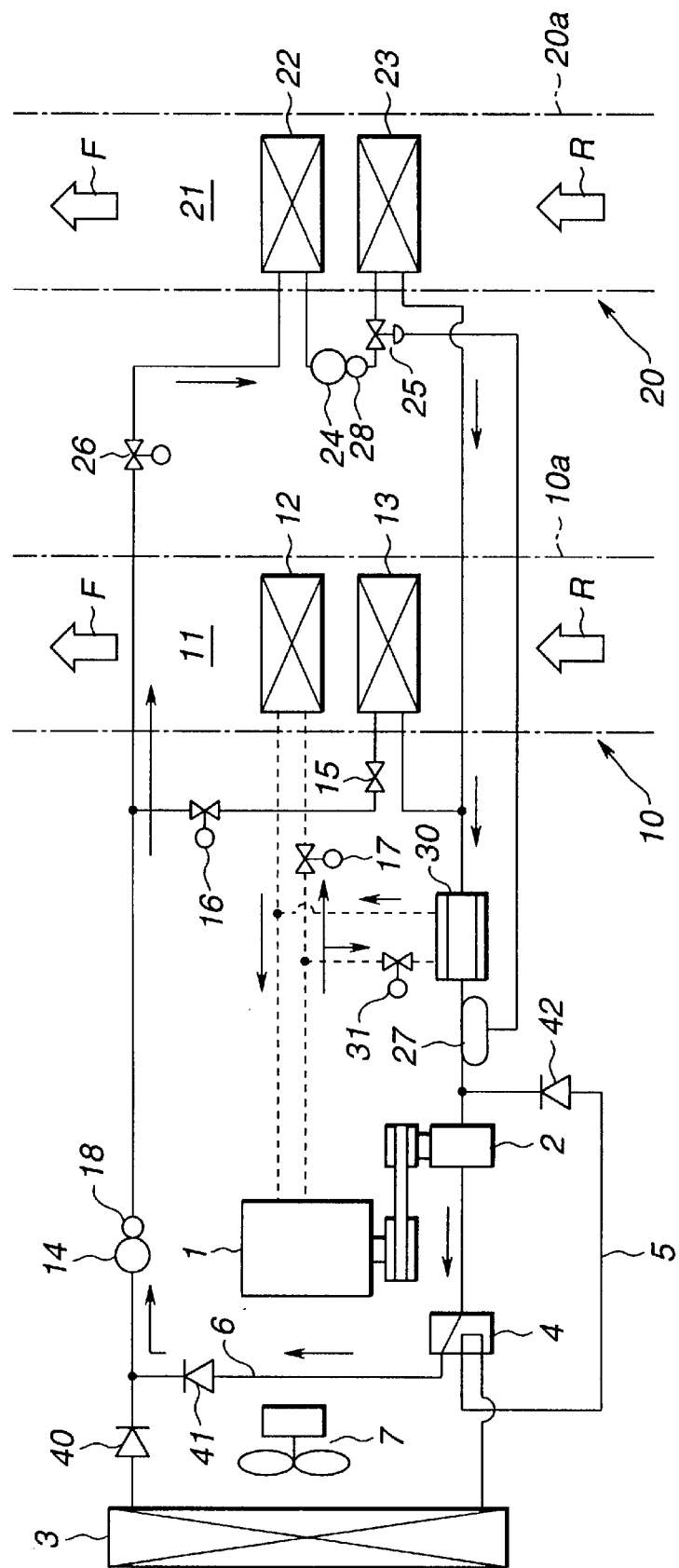
FIG. 2 is a schematic illustration similar to FIG. 1 but showing the operational mode of a heating operation of the air conditioning system of FIG. 1.
Figure 3:
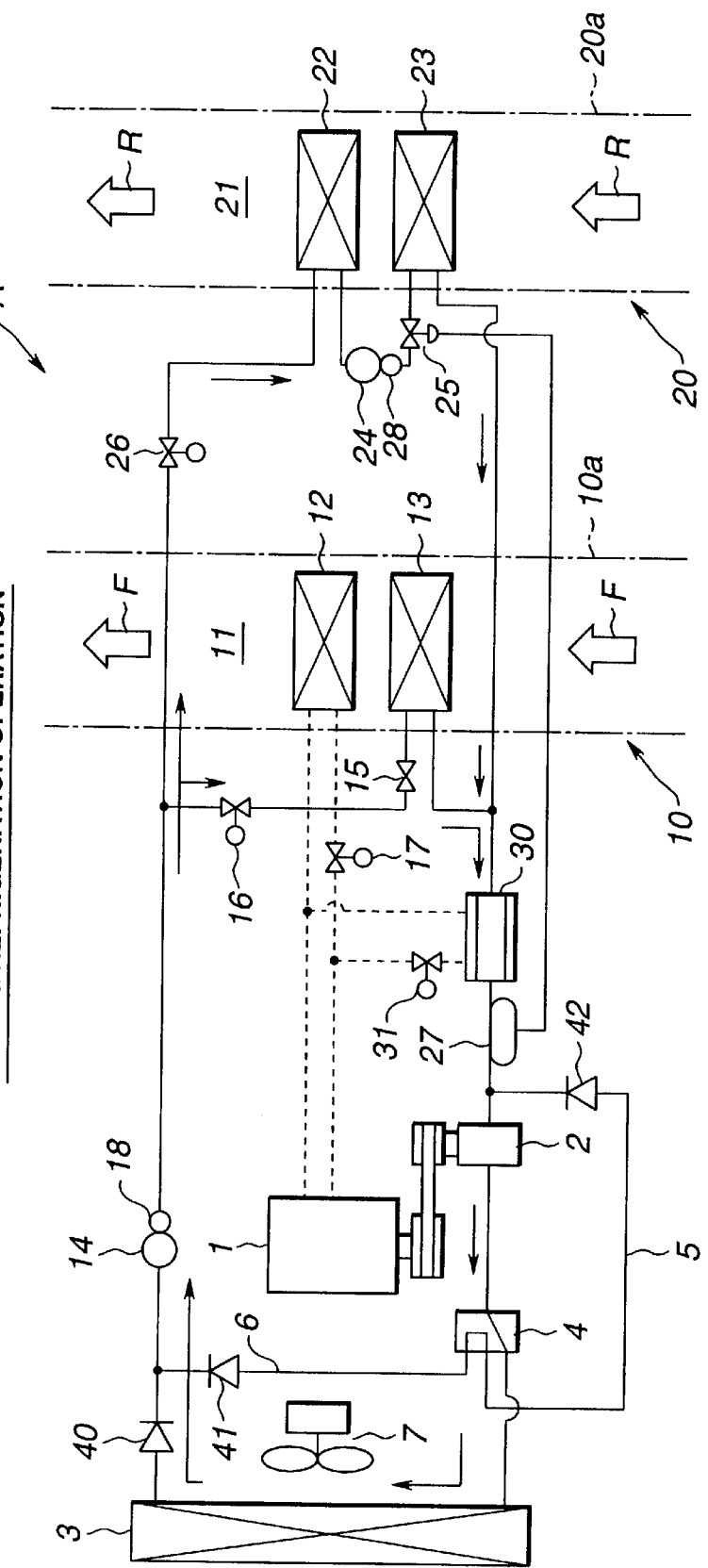
FIG. 3 is a schematic illustration similar to FIG. 1 but showing the operational mode of a refrigeration operation of the air conditioning system of FIG. 1.

Referring now to FIGS. 1 to 3, an embodiment of a heat pump type air conditioning system for an automotive vehicle is illustrated by the reference character A. The air conditioning system A comprises front or first unit 10 and a rear or second unit 20. The front unit 10 is arranged to condition air which is selectively drawn from the inside and the outside of a passenger compartment (not shown) of the automotive vehicle under the action of a fan (not shown) and to blow the conditioned air toward a front seat for vehicle passenger. The rear unit 20 is arranged to condition air which is selectively drawn from the inside and outside of the passenger compartment under the action of a fan and to blow out the conditioned air toward a rear seat for vehicle passenger.

The front unit 10 includes a casing 10*a* defining thereinside an air flow passage 11 in which air flows in a direction (air flow direction) indicated by arrows F. A heater core 12 and a front or first evaporator 13 are disposed in the air flow passage 11 and located respectively at the downstream and upstream sides relative to the air flow direction F. The heater core 12 is arranged such that engine coolant (hot water) heated by an engine 1 is circulated therethrough. The front evaporator 13 forms part of a refrigeration cycle. More specifically, the front unit 10 includes an intake unit (not identified), a cooling unit (not identified) and a heater unit (not identified) which are disposed in the order mentioned in the air flow direction in the casing 10a though not clearly shown. The intake unit includes an intake door (not shown) and the above-mentioned fan. The cooling unit includes the front evaporator 13. The heat unit includes an air mixing door (not shown) and the heater core 12. The air mixing door is disposed in front of the heater core 12 and arranged to control the ratio in flow amount between hot air passing through the heater core 12 and cool air bypassing the heater core 12 thereby to prepare air having a predetermined temperature in a region downstream of the heater core 12, and arranged to prevent air from passing through the heater core 12. Additionally, a variety of vents (air blow openings) are formed at the downstream side of the heater core 12 of the heater unit so as to blow the air (having been controlled in temperature) prepared upon mixing the hot air and the cool air toward the front seat inside the passenger compartment, though not shown.

The rear unit 20 includes a casing 20a defining thereinside an air flow passage 21 in which air flows in a direction (air flow direction) indicated by arrows R. A sub-condenser or second condenser 22 and a rear or second evaporator 23 are disposed in the air flow passage 21 and located respectively at the downstream and upstream sides relative to the air flow direction R. The sub-condenser 22 forms part of the refrigeration cycle. Both the sub-condenser 22 and the rear evaporator 23 are connected in parallel with the front evaporator 13 in the circuit of the refrigeration cycle, and connected in series with each other in the same circuit. More specifically, the rear unit 20 includes an intake unit (not identified), a cooling unit (not identified) and a heater unit (not identified) which are disposed in the order mentioned in the air flow direction in the air flow passage 21 similarly to the front unit 10, though not clearly shown. The intake unit includes an intake door (not shown) and the above-mentioned fan. The cooling unit includes the rear evaporator 23. The heater unit includes an air mixing door (not shown) and the sub-condenser 22. The air mixing door is disposed in front of the sub-condenser 22 and arranged to control a ratio in flow amount between hot air passing through the sub-condenser and cool air bypassing the sub-condenser 22 thereby to prepare air having a predetermined temperature in a region downstream of the sub-condenser 22, and arranged to prevent air from passing through the sub-condenser 22. Additionally, a variety of vents (air blow openings) are formed at the downstream side of the sub-condenser 22 of the heater unit so as to blow air (having been controlled in temperature) prepared upon mixing the hot air and the cool toward the rear seat inside the passenger compartment, though not shown.

A compressor 2 and a main or first condenser 3 are disposed outside the front and rear units 10, 20. The compressor 2 is drivably connected to an engine 1 of the automotive vehicle and arranged to be driven by the engine. The refrigeration cycle includes the compressor 2, the main condenser 3, the front evaporator 13, the sub-condenser 22, and the rear evaporator 23, and additionally a first liquid tank 14, a first expansion valve 15 for the front evaporator 13, a second liquid tank 24, and a second expansion valve 25 for the rear evaporator 23 which are connected to each other through a line or piping.

A four-way or circuit change-over valve 4 for changing a flow passage of the refrigerant is disposed at the inlet side of the main condenser 3 and includes a hermetically sealed casing (not identified) which is formed with one inlet port (not identified) and three outlet ports (not identified). A sliding member (not shown) is slidably disposed in the casing and arranged to establish communication between selected two of the three outlet ports, so that one outlet port other than the selected two outlet ports is brought into communication with the inlet port. The inlet port of the four-way valve 4 is in communication with the discharge side of the compressor 2, while the three outlet ports of the four-way valve 4 are respectively in communication with the inlet of the main condenser 3, the suction side of the compressor 2 (through a refrigerant return passage 5), and the outlet of the main condenser 3 (through a bypass passage 6). This four-way valve 4 functions to cause the flow of the refrigerant discharged from the compressor 2 to be changed over from a refrigerating circuit (or refrigerant circuit for a refrigeration operation) to a heating circuit (or refrigerant circuit for a heating operation) and vice versa. In the refrigerating circuit, the refrigerant discharged from the compressor 2 is introduced to the main condenser 3. In the heating circuit, the refrigerant discharged from the compressor 2 is introduced into the bypass passage 6 of the main condenser 3. The refrigerating circuit and the heating circuit will be discussed in detail after.

Figure 4:
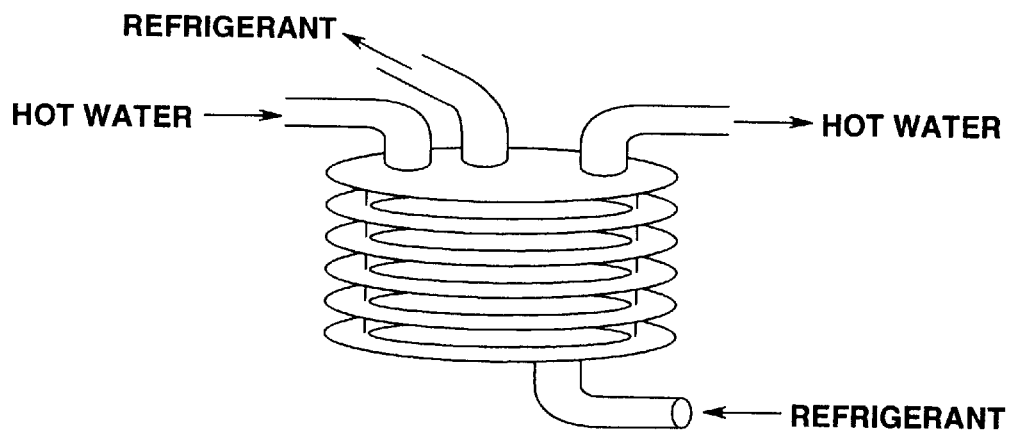
FIG. 4 is a schematic perspective view of a sub-evaporator used in the air conditioning system of FIG. 1.

A sub-evaporator or third evaporator 30 is disposed outside the front and rear units 10, 20 and located in the line between the suction side of the compressor 2 and the outlet of rear evaporator 23 in order to enhance a heating performance. The sub-evaporator 30 functions to heat the refrigerant passing through the inside thereof under a heat exchange between the refrigerant and an engine coolant (hot water) introduced from the engine 1. This sub-evaporator 30 has, for example, a structure shown in FIG. 4. In this embodiment, a temperature-responsive section 27 for the second expansion valve 25 is preferably installed to the outlet of the sub-evaporator 30.

The sub-evaporator 30 offers the following advantages: Even when the engine coolant is low in temperature so as not to be able to be used instantly for heating the passenger compartment under the heat exchange between the engine coolant and air, the refrigerant can effectively take in heat of the engine coolant under the heat exchange between it and the engine coolant in the sub-evaporator 30, in which the enthalpy of the refrigerant increases. Thereafter, the refrigerant is returned to the compressor 2 and again compressed, so that the compressor 2 discharges the refrigerant higher in temperature and supply the same to the sub-condenser 22. As a result, air subjected to heat exchange between it and the higher-temperature refrigerant becomes higher in temperature thereby exhibiting a higher heating performance while improving an instant or quick heating ability. Additionally, by disposing the temperature-responsive section 27 for the second expansion valve 25 at the outlet of the sub-evaporator 30 as discussed above, the flow amount of the refrigerant is regulated in accordance with the temperature of the refrigerant upon being heated by the sub-evaporator 30, and therefore more refrigerant can circulate during operation of the sub-evaporator 30 thereby further enhancing the heating performance.

While the sub-evaporator 30 has been shown and described as being disposed in the line between the suction side of the compressor 2 and the outlet of the front evaporator 13, it will be understood that the sub-evaporator 30 is not limited in its location, so that it is sufficient that the sub-evaporator 30 is located in the line between the suction side of the compressor 2 and the outlet of the rear evaporator 23 because the sub-evaporator 30 is operated only during the heating operation.

During the heating operation of the air conditioning system A, the refrigerant discharged from the compressor 2 flows only to the side of the rear unit 20 through the heating circuit (discussed after) so that no refrigerant flows to the side of the front unit 10. At this time, a first electromagnetic valve 16 is closed while a second electromagnetic valve 26 is opened. The first electromagnetic valve 16 is an electromagnetically operated closable valve which is adapted to make a control to allow the refrigerant from the liquid tank 14 to flow or to prevent the refrigerant from flowing to the side of the front unit 10. The second electromagnetic valve 26 is an electromagnetically operated closable valve which is adapted to make a control to allow the refrigerant from the liquid tank 14 to flow or to prevent the refrigerant from flowing to the side of the rear unit 20. In other words, at this time, the refrigerant discharged from the compressor 2 flows through the four-way valve 4, the bypass passage 6, the first liquid tank 14, the second electromagnetic valve 26, the sub-condenser 22, the second liquid tank 25, the second expansion valve 25, the rear evaporator 23, and the sub-evaporator 30 in the order mentioned and then returns to the compressor 2 as shown in FIG. 2.

The heater core 12 is provided, for example, at its inlet side with an electromagnetically operated hot water valve 17 which is adapted to be opened during the heating operation of the air conditioning system A so that hot water (engine coolant) from the engine 1 is introduced into the heater core 12.

The sub-evaporator 30 is provided, for example, at its hot water inlet side with a water valve 31 (as a flow amount control valve) whose opening degree is controllable, for example, by an actuator or the like. This water valve 31 is controlled in its opening degree in accordance with a thermal load condition of the vehicle, thereby controlling the flow amount of the hot water flowing through the sub-evaporator 30, during the heating operation, as discussed after.

During the refrigerating operation of the air conditioning system A, the refrigerant discharged from the compressor 2 normally flows through the refrigerating circuit (discussed after) to both the sides of the front unit 10 and the rear unit 20. At this time, both the first electromagnetic valve 16 and the second electromagnetic valve 26 are opened. In other words, at this time, as shown in FIG. 3, the refrigerant discharged from the compressor 2 flows through the four-way valve 4, the main condenser 3, and the first liquid tank 14 in the order mentioned, and then flows upon bifurcating into the side of the front unit 10 and the side of the rear unit 20. Thereafter, the bifurcated flows of the refrigerant are joined at the inlet of the sub-evaporator 30 and then return to the compressor 2. More specifically, for the front unit 10, the refrigerant discharged from the first liquid tank 14 flows through the first electromagnetic valve 16, the first expansion valve 15, and the front evaporator 13 in the order mentioned and then returns through the sub-evaporator 30 to the compressor 2. For the rear unit 20, the refrigerant discharged from the first liquid tank 14 flows through the second electromagnetic valve 26, the sub-condenser 22, the second liquid tank 25, the second expansion valve 25 and the rear evaporator 23 in the order mentioned and then returns through the sub-evaporator 30 to the compressor 2.

First and second pressure detectors 18, 28 are respectively provided at the high pressure sides of the refrigerant circuit in order to detect a discharge pressure (Pd) of the compressor 2. In this embodiment, the first pressure detector 18 is installed to the first liquid tank 14, while the second pressure detector 28 is installed to the second liquid tank 24. Each pressure detector 18, 28 is a pressure-responsive switch of a so-called trinary type including three diaphragms, or a pressure transducer (pressure sensor) which is adapted to convert a detected pressure into a voltage value. When the discharge pressure of the compressor 2 excessively rises, a variety of controls are made to lower the discharge pressure of the compressor 2 in accordance with the outputs (representative of the discharge pressure of the compressor) of the pressure detectors 18, 28. In this embodiment, either one of the pressure detectors 18, 28 is used upon being changed over in the refrigeration operation or in the heating operation, because the pressure of the liquid refrigerant after passing the condenser is used in place of the discharge pressure of the compressor. Specifically, the output of the first pressure detector 18 is used for controlling the discharge pressure of the compressor 2 in the refrigeration operation, while the output of the second pressure detector 28 is used for the same controlling in the heating operation.

As discussed above, the refrigerant return passage 5 has been shown and described as being disposed between the outlet side (one of the outlet ports) of the four-way valve 4 and the suction side of the compressor 2. This refrigerant return passage 5 functions to return the refrigerant staying in the main condenser 3 and the like to the compressor 2 in case that the engine coolant cannot be used as a heat source for heating the passenger compartment because the temperature of outside air is low. This enables a large amount of the refrigerant to be used to attain a high performance heating.

In this embodiment, an electric fan 7 is provided to cool the main condenser 3. Additionally, check valves 40, 41, 42 are provided to prevent the refrigerant from flowing in the opposite direction to the predetermined flow direction.

Though not shown, it is preferable that an accumulator is disposed in the line between the sub-evaporator 30 and the compressor 2. The accumulator is a container having a relatively large capacity to accumulate therein the refrigerant, and therefore functions to vaporize the refrigerant even if the refrigerant returns in its liquid state thereto. The thus vaporized refrigerant is returned to the compressor 2 thereby preventing the compressor 2 from its breakdown due to compression of liquid.

Next, the manner of operation of the thus arranged heat pump type air conditioning system A will be discussed hereinafter.

Initial Stage of Heating Operation

When the temperature of the outside air (outside the vehicle) is low so that the engine coolant has a lower temperature at the starting of the heating operation of the air conditioning system A, it is impossible to use the engine coolant for heating the passenger compartment, employing the heater core 12. At such a time, the refrigerant has stayed inside the main condenser 3 and the like, and therefore a large amount of the refrigerant does not exist in the compressor 2. In case of accomplishing heating for the rear seat under this condition, a setting is made as follows: The first electromagnetic valve 16 is closed; the second electromagnetic valve 26 is opened; the water valve 31 is fully opened; and the four-way valve 4 is in the state shown in FIG. 2.

When the compressor 2 is switched ON under this condition, the refrigerant which has stayed mainly in the main condenser 3 and the like is introduced into the suction side of the compressor 2 through the four-way valve 4 and the refrigerant return passage 5 so as to be recovered.

Accordingly, the compressor 2 is put into an operational state to discharge a large amount of the refrigerant. The high temperature and pressure refrigerant cannot flow to the side of the front unit 10 and therefore flows through the four-way valve 4, the bypass passage 6, the first liquid tank 14, the second electromagnetic valve 26, the sub-condenser 22, the second liquid tank 24, the second expansion valve 25, the rear evaporator 23, and the sub-evaporator 30 in the order mentioned so as to flow to the side of the rear unit 20, and then returns to the compressor 2. In this circulation process of the refrigerant, the low temperature and pressure refrigerant flown into the sub-evaporator 30 is heated under heat exchange between it and the engine coolant so as to be raised in temperature, and then sucked into the compressor 2 to be again compressed. By this, the refrigerant which has returned to and been again compressed by the compressor 2 is increased in enthalpy or raised in cycle balance, and is discharged in its high temperature and pressure state from the compressor 2. At this time, the opening degree (corresponding to the flow amount of the refrigerant) of the second expansion valve 25 is controlled in accordance with the temperature of the refrigerant at the outlet of the sub-evaporator 30 which temperature is detected by the temperature-responsive section 27. Accordingly, when the refrigerant temperature at the outlet of the sub-evaporator 30 increases under the heat exchange between the refrigerant and the engine coolant, the opening degree of the second expansion valve 25 increases so that more refrigerant can circulate. Since the heating ability (heat releasing ability) of the sub-condenser 22 is in relation to the temperature and flow amount of the refrigerant, a higher heating ability can be exhibited by thus increasing the temperature and flow amount of the discharged refrigerant. Such a tendency is increased with lapse of time, thereby improving the instant or quick heating ability. That is, when such an operation of the air conditioning system A is continued for a while so that the temperature of the engine coolant becomes higher, the amount of heat absorbed from the engine coolant to the refrigerant in the sub-evaporator 2 is increased, and therefore the temperature of the refrigerant sucked into the compressor 2 is increased in a multiplicative manner, thus achieving large improvements in heating performance and the instant heating ability.

At this time, air taken into the rear unit 20 is dehumidified and refrigerated by the rear evaporator 23 and then heated by the sub-condenser 22, and thereafter flows to the downstream side to be blown through the predetermined vents into the passenger compartment. This realizes a heating with dehumidification, in which the dehumidified air is heated.

It is possible to carry out such a control as to prevent air from passing in contact with the sub-condenser 22 under the action of an air mixing door (not shown), until the temperature of the air blown through the vents increases to a predetermined temperature.

The above-discussion has been made only on the heating only for the rear seat. Heating for the front seat is carried out by using only the engine coolant, and therefore it is preferable to make at least one of first and second operations until the temperature of the engine coolant rises to a level suitable for the heating the passenger compartment after the starting of the engine 1. The first operation is to close the hot water valve 17; and the second operation is to prevent air from passing in contact with the heater core 12 under the action of an air mixing door (not shown).

Even at the initial stage of the heating operation of the air conditioning system A, there occurs a case in which the discharge pressure of the compressor 1 rapidly increases when the engine speed of the engine 1, i.e., the rotational speed of the compressor 2 rapidly increases, for example, upon depression of an accelerator pedal (not shown) for a rapid deceleration. In such a case, it is necessary to make a control for lowering the discharge pressure of the compressor 2 in order to protect the compressor 2 from its breakage. This necessity is common during a stable heating operation, and therefore the control for lowering the discharge pressure of the compressor 2 will be discussed hereinafter for the operation of the air conditioning system A during the stable heating operation.

During Stable Heating Operation

When the temperature of the engine coolant rises to some extent so that the temperature within the passenger compartment rises to some extent, the amount of the hot water flowing into the sub-evaporator 30 is controlled by adjusting the opening degree of the water valve 3 1, for example, under the action of an actuator (not shown) in order to obtain a predetermined heating performance in accordance with the thermal load condition of the vehicle.

Figure 5:
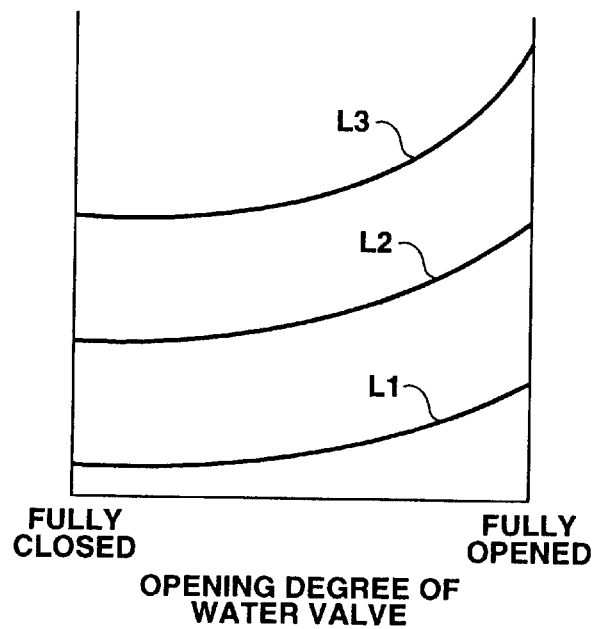
FIG. 5 is a graph showing the change in heating performance of the air conditioning system of FIG. 1 in terms of the opening degree of a water valve used in the air conditioning system of FIG. 1.

FIG. 5 shows the relationship between the opening degree of the water valve 31 and the heating performance in a state where the temperature of the hot water (engine coolant) is stable. As apparent from FIG. 5, in the hot water temperature stable state, as the opening degree of the water valve 31 increases, the amount of the refrigerant circulating the refrigeration cycle increases as indicated by a line L1; the discharge pressure (Pd) of the compressor 2 increases as indicated by a line L2; and the temperature of the air blowing through the vents into the passenger compartment increases as indicated by a line L3. The principle of the relationship shown in FIG. 5 will be appreciated from the discussion made before. That is, when the opening degree of the water valve 31 is increased, the amount of the hot water (engine coolant) flown into the sub-evaporator 30 increases and therefore the amount of the heat exchange between the hot water and the refrigerant increases so that the temperature of the refrigerant at the outlet of the sub-evaporator 30 rises. As a result, the opening degree of the second expansion valve 25 increases to increase the flow amount of the refrigerant while the discharge pressure of the compressor 2 increases with a rise in the temperature of the refrigerant to be sucked in the compressor 2. This increases the heat releasing ability of the sub-condenser 22 thereby increasing the temperature of the air blown through the vents to the passenger compartment.

A concrete example of controlling the heat releasing ability of the sub-condenser 22 will be discussed. When the temperature of outside air is not so low so that the heat of the engine coolant is not required in the thermal load condition (a predetermined heating ability) of the vehicle, the water valve 31 is fully closed thereby preventing the engine coolant from flowing into the sub-evaporator 30. This prevents the refrigerant to return to the compressor 2 from being unnecessarily heated.

When the temperature of the outside air is very low so that the thermal load condition (a predetermined heating ability) of the vehicle is very high (over-thermal load condition), the water valve 31 is fully opened thereby to cause the maximum amount of the engine coolant to flow into the sub-evaporator 30. This allows the refrigerant to return to the compressor 2 to be heated in maximum by the sub-evaporator 30 thus exhibiting the maximum heating ability in the air conditioning system A.

When the temperature of the outside air is between the above two cases, the opening degree of the water valve 31 is controlled to regulate the flow amount of the hot water to flow into the sub-evaporator 30 so as to obtain a predetermined heating ability corresponding to the thermal load condition of the vehicle.

Thus, the opening degree of the water valve 31 is controlled in accordance with the thermal load condition of the vehicle, thereby making it possible to cause the air conditioning system A to exhibit delicate heating performances suitable for the thermal load conditions of the vehicle.

Next, measures for protecting the compressor 2 at the time when the discharge pressure of the compressor 2 excessively rises in this embodiment will be discussed.

EXAMPLE 1

In this Example, an on-off control of the water valve 31 and an on-off control of the compressor 2 are carried out in accordance with the discharge pressure of the compressor.

Figure 6:
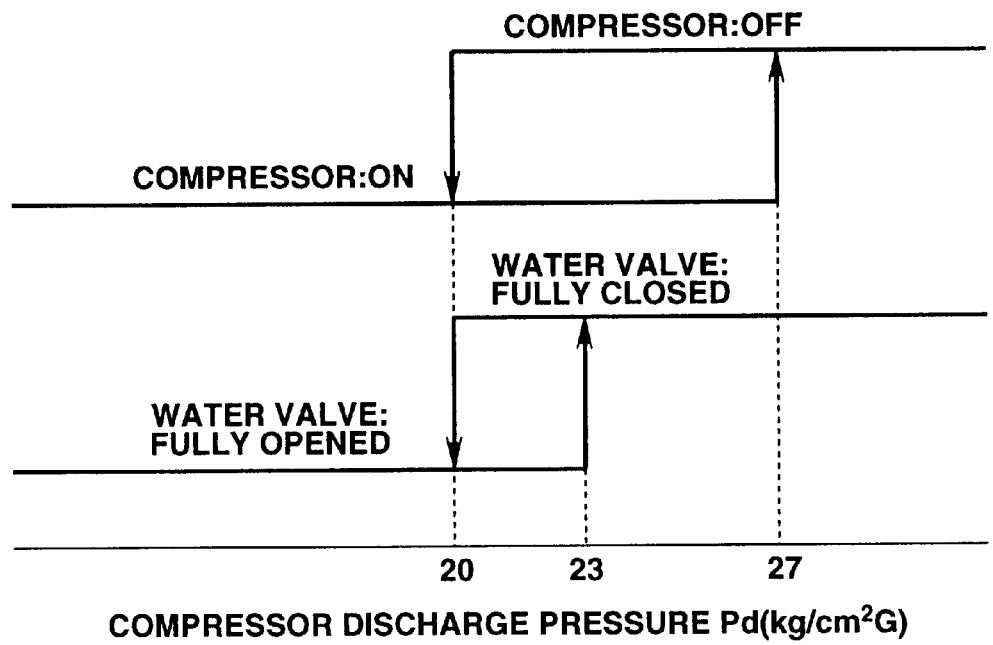
FIG. 6 is a graph showing an example of a control for protecting a compressor used in the air conditioning system of FIG. 1 during a heating operation of the air conditioning system.

An example of such controls is shown in FIG. 6 and will be discussed. First, discussion will be made on a control manner at a stage before making the on-off control of the compressor 2. When the output (representative of the discharge pressure of the compressor) of the pressure detector 28 inside the second liquid tank 24 reaches a value not lower than 23 kg/cm$^2$G as a first set value, the water valve 31 is put into its fully closed (OFF) state. When the same output is lowered to a value not higher than 20 kg/cm$^2$G as a second set value, the water valve 31 is again put into its fully opened (ON) state. It is to be noted that it is assumed that the over-thermal load condition to fully open the water valve 31 in controlling the flow amount of the hot water has been established when the compressor discharge pressure is around 20 kg/cm$^2$G.

In this over-thermal load condition, the water valve 31 is normally fully opened to operate the sub-evaporator 30, in which the refrigeration cycle is operated constantly in a state where the discharge pressure of the compressor is relatively high (around 20 kg/cm$^2$G). In this state, when the water valve 31 is put into its fully closed state, the discharge pressure of the compressor 2 lowers as shown in FIG. 5 so that a pressure rise of the compressor 2 is suppressed to protect the compressor 2.

In case that the water valve 31 is put into its fully closed state, the temperature of the air blown through the vents lowers simultaneously with lowing in the discharge pressure of the compressor 2 as shown in FIG. 5; however, according to the experiments, it has been confirmed that a change in temperature of the air blown through the vents can be suppressed to such a small value that the vehicle passenger cannot feel uncomfortable thereby preventing comfortableness of the vehicle passenger from being degraded, by suitably setting a standard set value at which the ON state and the OFF state of the water valve 31 is changed. For example, in case of the control characteristics shown in FIG. 6, the change in temperature under the switching action of the water valve 31 between its ON state and its OFF state is within about 10° C. in a cycle including a temperature rise of about 3 minutes and a temperature lowering of about 1 minute.

In addition to the above on-off control of the water valve 31, the on-off control of the compressor 2 is also carried out similarly to conventional heat pump type air conditioning systems in order to cope with a case where the discharge pressure of the compressor 2 excessively rise to such an extent as not to be regulated by the on-off control of the water valve 31. More specifically, when the output (representative of the discharge pressure of the compressor) of the pressure detector 28 inside the second liquid tank 24 reaches a value not lower than 27 kg/cm$^2$G as a standard value for stopping the compressor 2, the compressor 2 is stopped or put into its OFF state. When the same output lowers to a value not higher than 20 kg/cm$^2$G as a standard value for operating the compressor 2, the compressor 2 is again operated or put into its ON state.

While the pressure detector 28 to be used for these on-off controls may be the pressure-responsive switch of the so-called trinary type, or the pressure transducer (pressure sensor); however, it is preferable to use the pressure transducer from the view points of frequency of on-off actions, durability, and readiness in changing the set values.

As apparent from the above, according to this example, when the discharge pressure of the compressor 2 excessively rises, the discharge pressure of the compressor 2 is lowered by carrying out the on-off control of the water valve 31 at a stage before carrying out the on-off control of the compressor 2. As a result, the frequency of the on-off actions in the on-off control of the compressor 2 during a pressure rise of the compressor 2 decreases, thereby improving the drivability of the vehicle. Additionally, at this time, the temperature change of the air blown through the vents can be suppressed to such a small value as not to degrade comfortableness of the vehicle passenger.

It will be understood that dual protecting means are provided to cope with a pressure rise of the compressor 2 since the on-off control of the water valve 31 is carried out in addition to carrying out the on-off control of the compressor 2, thereby improving the reliability of the air conditioning system A.

While the on-off control has been shown and described as being made on the water valve 31, it will be understood that the opening degree of the water valve 31 may be continuously changed in accordance with the discharge pressure of the compressor 2 in order to suppress a pressure rise in the compressor 2. In this case, it is preferable to the previously prepare a map data upon taking account of the rotational speed of the compressor 2 (or the engine speed of the engine 1) so as to minimize the temperature change of the air blown through the vents. Additionally, it is preferable to use as the pressure detector 28 the pressure transducer pressure sensor) which can make a continuous output.

EXAMPLE 2

Figure 7:
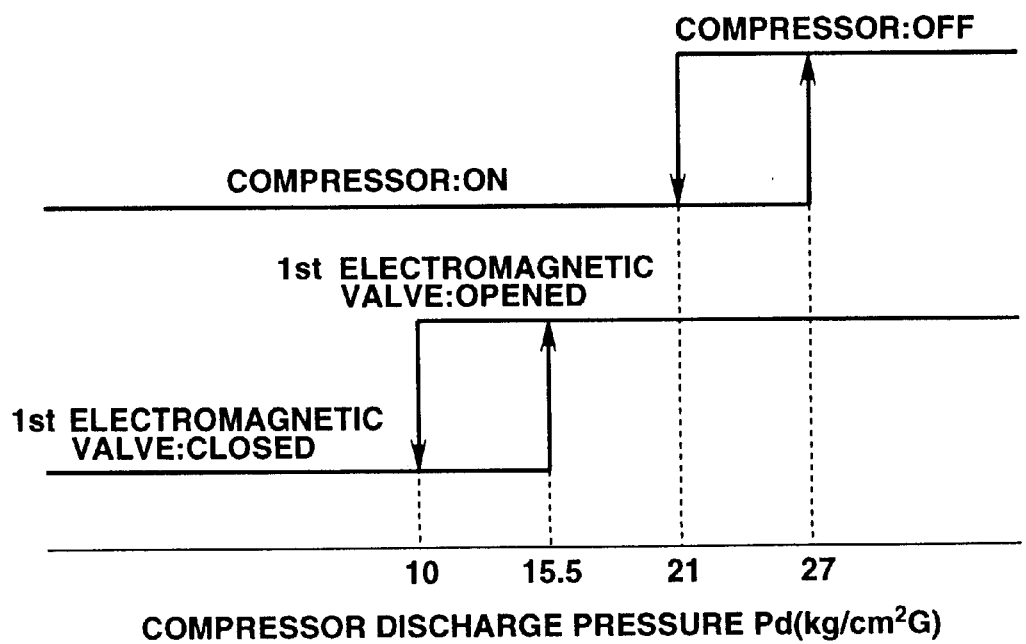
FIG. 7 is a graph showing another example of the control for protecting a compressor used in the air conditioning system of FIG. 1 during a heating operating of the air conditioning system.

In this Example, an on-off (open-close) control of the first electromagnetic valve 16 and the on-off control of the compressor 2 are carried out in accordance with the discharge pressure of the compressor 2. In this Example, the pressure-responsive switch of the trinary type or the pressure transducer (pressure sensor) may be used as the pressure detector 28. An example of such controls is shown in FIG. 7 and will be discussed. First, discussion will be made on a control manner at a stage before making the on-off control of the compressor 2. When the output (representative of the discharge pressure of the compressor) of the pressure detector 28 inside the second liquid tank 24 reaches a value not lower than 15.5 kg/cm$^2$G as a third set value, the first electromagnetic valve 16 is put into its opened state. When the same output is lowered to a value not higher than 10 kg/cm$^2$G as a fourth set value, the first electromagnetic valve 16 is again put into its closed state.

During the heating operation of the air conditioning system A, as discussed above, the first electromagnetic valve 16 is closed as shown in FIG. 2. In this condition, when the first electromagnetic valve 16 is opened so that a part of the refrigerant from the liquid tank 14 flows to the side of the front unit 10, the refrigerant flows also into the front evaporator, and therefore the flow amount of the refrigerant toward the side of the rear unit 20 decreases. Additionally, the refrigerant which has not been condensed flows directly into the front evaporator 13, and therefore the front evaporator 13 functions as a condenser so that the discharge pressure of the compressor 2 is lowered.

In addition to the above on-off (open-close) control of the first electromagnetic valve 16, the on-off control of the compressor 2 is also carried out similarly to conventional heat pump type air conditioning systems in order to cope with a case where the discharge pressure of the compressor 2 excessively rise to such an extent as not to be able to be regulated by the on-off (open-close) control of the water valve 31. More specifically, when the output (representative of the discharge pressure of the compressor) of the pressure detector 28 inside the second liquid tank 24 reaches a value not lower than 27 kg/cm$^2$G as a standard set value for stopping the compressor 2, the compressor 2 is stopped or put into its OFF state. When the same output lowers to a value not higher than 21 kg/cm$^2$G as a standard value for operating the compressor 2, the compressor 2 is again operated or put into its ON state.

As apparent from the above, according to this example, when the discharge pressure of the compressor 2 excessively rises, the discharge pressure of the compressor 2 is lowered by carrying out the on-off (open-close) control of the first electromagnetic valve 16 at a stage before carrying out the on-off control of the compressor 2 decreases. As a result, the frequency of the on-off actions in the on-off control of the compressor 2 during a pressure rise of the compressor 2, thereby improving the drivability of the vehicle. Additionally, at this time, a normal heating operation is continued at the side of the rear unit 20, and therefore heating for the rear seat cannot be degraded.

It will be understood that dual protecting means are provided to cope with a pressure rise of the compressor 2 since the on-off (open-close) control of the first electromagnetic valve 16 is carried out in addition to carrying out the on-off control of the compressor 2, thereby improving the reliability of the air conditioning system A.

EXAMPLE 3

Figure 8:
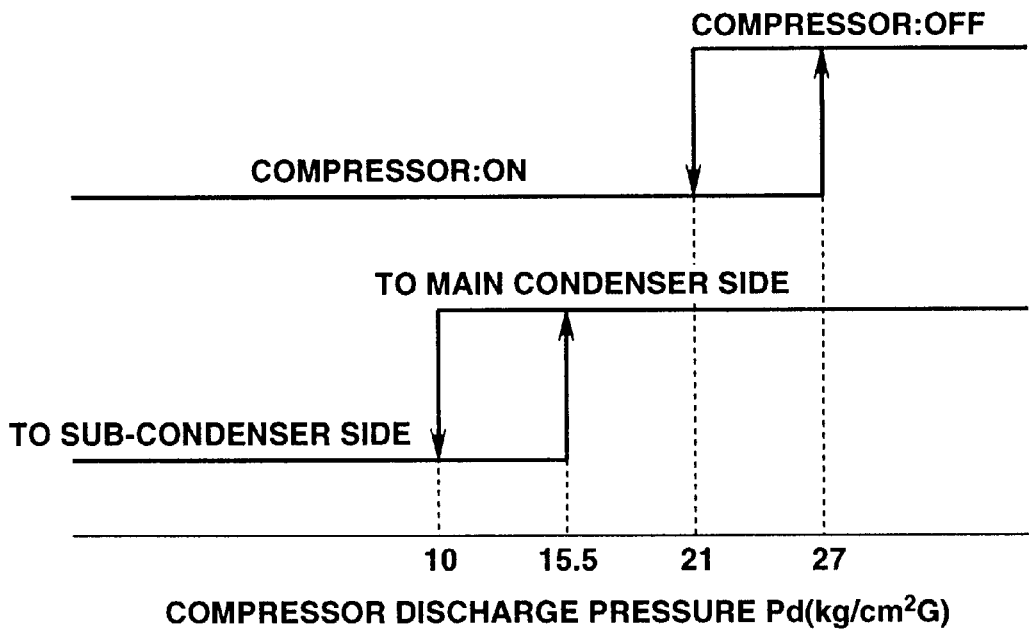
FIG. 8 is a graph showing a further example of the control for protecting a compressor used in the air conditioning system of FIG. 1 during a heating operation of the air conditioning system.

In this Example, a change-over control of the four-way valve 4 and the on-off control of the compressor 2 are carried out in accordance with the discharge pressure of the compressor 2. In this Example, the pressure-responsive switch of the trinary type or the pressure transducer (pressure sensor) may be used as the pressure detector 28. An example of such controls is shown in FIG. 8 and will be discussed. First, discussion will be made on a control manner at a stage before making the on-off control of the compressor 2. When the output (representative of the discharge pressure of the compressor) of the pressure detector 28 inside the second liquid tank 24 reaches a value not lower than 15.5 kg/cm$^2$G as a fifth set value, a first operational state of the four-way valve 4 is changed over into a second operational state to allow the refrigerant to flow to the main condenser 3. When the same output is lowered to a value not higher than 10 kg/cm$^2$G as a sixth set value, the second operational state of the four-way valve 4 is again changed over into the first operational state to prevent the refrigerant from flowing to the condenser 3.

During the heating operation of the air conditioning system A, as discussed above, the refrigerant is not flown to the main condenser 3 as shown in FIG. 2. In this condition, when the operational state of the four-way valve 4 is changed over to allow the refrigerant discharged from the compressor 2 to flow to the main condenser 3, heat exchange is made between the refrigerant and the outside air (at a low temperature) in contact with the main condenser 3, so that the condensing ability for the refrigerant is raised thereby to lower the discharge pressure of the compressor 2.

In addition to the above change-over control of the four-way valve 4, the on-off control of the compressor 2 is also carried out similarly to conventional heat pump type air conditioning systems in order to cope with a case where the discharge pressure of the compressor 2 excessively rise to such an extent as not to be able to be regulated by the change-over control of the four-way valve 4. More specifically, when the output (representative of the discharge pressure of the compressor) of the pressure detector 28 inside the second liquid tank 24 reaches the value not lower than 27 kg/cm$^2$G as a standard value for stopping the compressor 2, the compressor 2 is stopped or put into its OFF state. When the same output lowers to the value not higher than 21 kg/cm$^2$G as a standard set value for operating the compressor 2, the compressor 2 is again operated or put into its ON state.

As apparent from the above, according to this example, when the discharge pressure of the compressor 2 excessively rises, the discharge pressure of the compressor 2 is lowered by carrying out the change-over control of the four-way valve 4 at a stage before carrying out the on-off control of the compressor 2. As a result, the frequency of the on-off actions in the on-off control of the compressor 2 during a pressure rise of the compressor 2 decreases, thereby improving the derivability of the vehicle.

It will be understood that dual protecting means are provided to cope with a pressure rise of the compressor 2 since the change-over control of the four-way valve 4 is carried out in addition to carrying out the on-off control of the compressor 2, thereby improving the reliability of the air conditioning system A.

During Refrigeration Operation

In case of accomplishing refrigeration for both the front and rear seats, a setting is made as follows: The first electromagnetic valve 16 and the second electromagnetic valve 26 are opened; the four-way valve 4 is put into the state shown in FIG. 3; and the water valve 31 is fully closed. In order to accomplish a temperature control for the front seat, the hot water valve 17 is kept opened.

In this condition, when the compressor 2 is switched ON, the refrigerant discharged from the compressor 2 is bifurcated into the side of the front unit 10 and the side of the rear unit 20. That is, as shown in FIG. 3, the refrigerant from the compressor 2 flows through the four-way valve 4, the main condenser 3, and the first liquid tank 14 in the order mentioned, and then bifurcated into the side of the front unit 10 and the side of the rear unit 20. The bifurcated refrigerants are joined at the inlet of the sub-evaporator 30 and then return to the compressor 2. More specifically, for the front unit 10, the refrigerant discharged from the first liquid tank 14 flows through the first electromagnetic valve 16, the first expansion valve 15, and the front evaporator 13 in the order mentioned and then returns through the sub-evaporator 30 to the compressor 2. For the rear unit 20, the refrigerant discharged from the first liquid tank 14 flows through the second electromagnetic valve 26, the sub-condenser 22, the second liquid tank 25, the second expansion valve 25 and the rear evaporator 23 in the order mentioned and then returns through the sub-evaporator 30 to the compressor 2. In this circulation process of the refrigerant, the refrigerant which has been already condensed and liquefied by the main condenser 3 is supplied to the sub-condenser 22 in the rear unit 20, and therefore the sub-condenser 22 is not so high in ability as a heat exchanger. Additionally, in this circulation process, since the water valve is fully closed to prevent the hot water from flowing into the sub-evaporator 30, the sub-evaporator 30 does not function thereby to prevent a temperature rise at the low pressure side thus avoiding degradation of a refrigerating performance of the air conditioning system A.

By this, for the front seat, the air taken in the air passage 11 of the front unit 10 is cooled and dehumidified under the heat exchange between it and the refrigerant in the front evaporator 13, and converted into cool air. The cool air is mixed with warm air (air heated by the heater core 12) in a suitable ratio under the action of the air mixing door (not shown) so as to be regulated in temperature. Otherwise, the cool air may not be mixed with the warm air. The cool air is then blown through the predetermined vents to the passenger compartment.

For the rear seat, the air taken in the air passage 21 of the rear unit 20 is cooled and dehumidified under the heat exchange between it and the refrigerant in the rear evaporator 23, and converted into cool air. The cool air is mixed with warm air (air heated by the sub-condenser 22) in a suitable ratio under the action of the air mixing door (not shown) so as to be adjusted in temperature, or may not be mixed with the warm air, and then is blown through the predetermined vents to the passenger compartment.

It will be understood that it is sufficient that the first electromagnetic valve 16 is closed merely in order to refrigerate the front seat, and that the second electromagnetic valve 26 is closed merely in order to refrigerate only the rear seat.

As the measures for protecting the compressor 2 at the time when the discharge pressure of the compressor 2 excessively rises, here an on-off control of the electric fan 7 and the on-off control of the compressor 2 are carried out in accordance with the discharge pressure of the compressor 2, similarly to conventional heat pump type air conditioning systems. For this purpose, such controls are made in response to the output (signal) from the pressure detector 18. The pressure detector 18 to be used for these on-off controls may be the pressure-responsive switch of the so-called trinary type, or the pressure transducer (pressure sensor) as same as the pressure detector 28 operated during the heating operation.

Figure 9:
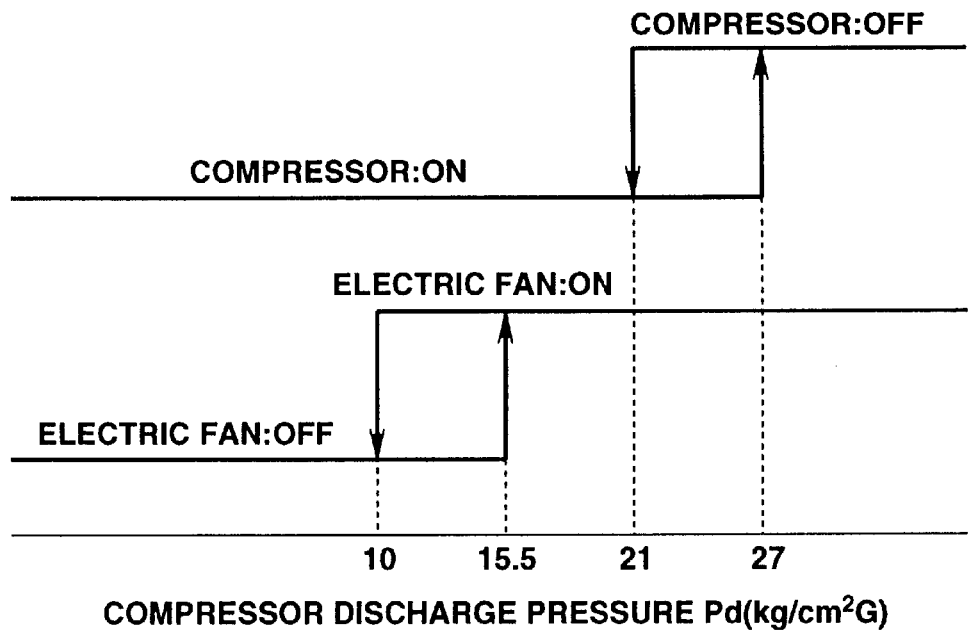
FIG. 9 is a graph showing an example of the control for protecting a compressor used in the air conditioning system of FIG. 1 during a refrigeration operation of the air conditioning system.

An example of such controls is shown in FIG. 9 and will be discussed. First, discussion will be made on a control manner at a stage before making the on-off control of the compressor 2. When the output (representative of the discharge pressure of the compressor) of the pressure detector 18 inside the first liquid tank 14 reaches a value not lower than 15.5 kg/cm$^2$G, the electric fan 7 is switched ON. When the same output is lowered to a value not higher than 10 kg/cm$^2$G as a second set value, the electric fan 7 is switched OFF. When the electric fan 7 is switched ON, the heat releasing amount of the main condenser 3 increases so that the pressure of the refrigerant to be discharged from the main condenser 3 lowers.

In addition to the above on-off control of the electric fan 7, the on-off control of the compressor 2 is also carried out in order to cope with a case where the discharge pressure of the compressor 2 excessively rise to such an extent as not to be able to be regulated by the on-off control of the electric fan 7. More specifically, when the output (representative of the discharge pressure of the compressor) of the pressure detector 28 inside the second liquid tank 24 reaches the value not lower than 27 kg/cm$^2$G as a standard value for stopping the compressor 2, the compressor 2 is stopped or put into its OFF state. When the same output lowers to the value not higher than 21 kg/cm$^2$G as a standard value for operating the compressor 2, the compressor 2 is again operated or put into its ON state.

While the four-way valve 4 and the refrigerant return passage 5 have been shown and described as being provided in this embodiment for the purpose of returning the staying refrigerant to the compressor 2, it will be understood that it is not essential so that the refrigeration operation of the air conditioning system A is carried out without returning the staying refrigerant to the compressor 2. For this case, two valve (operable to open or close) may be respectively disposed at the inlet of the main condenser 3 and the bypass passage 6, though not shown.

What is claimed is:

1. A heat pump type air conditioning system (A) for an automotive vehicle, comprising:

first and second units (10, 20) which respectively have first and second air flow passages (11, 21) through which air taken in is introduced to a passenger compartment of the vehicle, said first unit including a heater core (12) and a first evaporator (13) which are disposed in the first air flow passage and located such that said heater core is at the downstream side of said first evaporator relative to flow of air in the first air passage, an engine coolant being able to circulate through said heater core, said second unit including a second condenser (22) and a second evaporator (23) which are disposed in the second air flow passage and located such that the second condenser is at the downstream side of said second evaporator relative to flow of air in the second air passage, said second condenser (22) and said second evaporator (23) being fluidly connected in parallel with said first evaporator (13) and fluidly connected in series with each other;

a compressor (2) and a first condenser (3) disposed outside said first and second units which constitute a refrigeration cycle including said first evaporator (13);

a refrigeration operation refrigerant circuit for accomplishing a refrigeration operation of said air conditioning system, said refrigeration operation refrigerant circuit including said first condenser (3);

a heating operation refrigerant circuit for accomplishing a heating operation of said air conditioning system, said heating operation refrigerant circuit including a bypass passage (6) for allowing the refrigerant to flow bypassing said first condenser;

a circuit change-over valve (4) for causing flow of the refrigerant discharged from said compressor (2) to be changed over between said refrigeration operation refrigerant circuit and said heating operation refrigerant circuit;

a third evaporator (30) disposed outside said first and second units (10, 20) and fluidly connected to a fluid outlet of said second evaporator (23), the engine coolant being able to circulate through said third evaporator, the refrigerant to be returned to said compressor (2) being heated with the engine coolant in said third evaporator (30); and a flow control valve (31) for controlling a flow amount of the engine coolant circulating through said third evaporator (30) in accordance with a thermal load condition of the vehicle under control of an opening degree of said flow control valve, during the heating operation of said air conditioning system.

2. A heat pump type air conditioning system as claimed in claim 1, wherein said flow control valve (31) is set to take its fully closed state to prevent the engine coolant from circulating through said third evaporator (30) when a discharge pressure of said compressor (2) rises to a level not lower a first set value which is lower than a standard value to stop an operation of said compressor, and to take its fully opened state to allow the engine coolant to circulate through said third evaporator (30) when the discharge pressure of said compressor (2) lowers to a level not higher than a second set value which is lower than the first set value.

3. A heat pump type air conditioning system (A) for an automotive vehicle, comprising:

first and second units (10, 20) which respectively have first and second air flow passages (11, 21) through which air taken in is introduced to a passenger compartment of the vehicle, said first unit including a heater core (12) and a first evaporator (13) which are disposed in the first air flow passage and located such that said heater core is at the downstream side of said first evaporator relative to flow of air in the first air passage, an engine coolant being able to circulate through said heater core, said second unit including a second condenser (22) and a second evaporator (23) which are disposed in the second air flow passage and located such that the second condenser is at the downstream side of said second evaporator relative to flow of air in the second air passage, said second condenser (22) and said second evaporator (23) being fluidly connected in parallel with said first evaporator (13) and fluidly connected in series with each other;

a compressor (2) and a first condenser (3) disposed outside said first and second units which constitute a refrigeration cycle including said first evaporator (13);

a refrigeration operation refrigerant circuit for accomplishing a refrigeration operation of said air conditioning system, said refrigeration operation refrigerant circuit including said first condenser (3);

a heating operation refrigerant circuit for accomplishing a heating operation of said air conditioning system, said heating operation refrigerant circuit including a bypass passage (6) for allowing the refrigerant to flow bypassing said first condenser;

a circuit change-over valve (4) for causing flow of the refrigerant discharged from said compressor (2) to be changed over between said refrigeration operation refrigerant circuit and said heating operation refrigerant circuit;

a third evaporator (30) disposed outside said first and second units (10, 20) and fluidly connected to a fluid outlet of said second evaporator (23), the engine coolant being able to circulate through said third evaporator, the refrigerant to be returned to said compressor (2) being heated with the engine coolant in said third evaporator (30); and a flow control valve (16) for controlling a flow amount of the refrigerant to be introduced to said first evaporator (13), said flow control valve (16) being set to take its opened state to allow the refrigerant to be introduced to said first evaporator (13) when a discharge pressure of said compressor (2) rises to a level not lower than a third set value which is lower than a standard value to stop an operation of said compressor, and to take its closed state to prevent the refrigerant from being introduced to said first evaporator (13) when the discharge pressure of said compressor (2) lowers to a level not higher than a fourth set value which is lower than the third set value, during the heating operation of said air conditioning system.

4. A heat pump type air conditioning system (A) for an automotive vehicle, comprising:

first and second units (10, 20) which respectively have first and second air flow passages (11, 21) through which air taken in is introduced to a passenger compartment of the vehicle, said first unit including a heater core (12) and a first evaporator (13) which are disposed in the first air flow passage and located such that said heater core is at the downstream side of said first evaporator relative to flow of air in the first air passage, an engine coolant being able to circulate through said heater core, said second unit including a second condenser (22) and a second evaporator (23) which are disposed in the second air flow passage and located such that the second condenser is at the downstream side of said second evaporator relative to flow of air in the second air passage, said second condenser (22) and said second evaporator (23) being fluidly connected in parallel with said first evaporator (13) and fluidly connected in series with each other;

a compressor (2) and a first condenser (3) disposed outside said first and second units which constitute a refrigeration cycle including said first evaporator (13);

a refrigeration operation refrigerant circuit for accomplishing a refrigeration operation of said air conditioning system, said refrigeration operation refrigerant circuit including said first condenser (3);

a heating operation refrigerant circuit for accomplishing a heating operation of said air conditioning system, said heating operation refrigerant circuit including a bypass passage (6) for allowing the refrigerant to flow bypassing said first condenser;

a circuit change-over valve (4) for causing flow of the refrigerant discharged from said compressor (2) to be changed over between said refrigeration operation refrigerant circuit and said heating operation refrigerant circuit; and a third evaporator (30) disposed outside said first and second units (10, 20) and fluidly connected to a fluid outlet of said second evaporator (23), the engine coolant being able to circulate through said third evaporator, the refrigerant to be returned to said compressor (2) being heated with the engine coolant in said third evaporator (30);

wherein said circuit change-over valve is set to take its first position to cause the flow of the refrigerant discharged from said compressor (2) to be changed over to said refrigeration operation refrigerant circuit when a discharge pressure of said compressor (2) rises to a level not lower a fifth set value which is lower than a standard value to stop an operation of said compressor, and to take its second position to cause the flow of the refrigerant discharged from said compressor (2) to be changed over to said heating operation refrigerant circuit when the discharge pressure of said compressor (2) lowers to a level not higher than a sixth set value which is lower than the fifth set value, during the heating operation of said air conditioning system.

5. A heat pump type air conditioning system as claimed in claim 1, wherein said flow control valve (31) is arranged to control the flow amount of the engine coolant circulating through said third evaporator (30) in accordance with a discharge pressure of said compressor under control of an opening degree of said flow control valve, during the heating operation of said air conditioning system.

6. A heat pump type air conditioning system as claimed in claim 1, further comprising a flow control valve (16) for controlling a flow amount of the refrigerant to be introduced to said first evaporator (13), said flow control valve (16) being set to take its opened state to allow the refrigerant to be introduced to said first evaporator (13) when a discharge pressure of said compressor (2) rises to a level not lower than a third set value which is lower than a standard value to stop an operation of said compressor, and to take its closed state to prevent the refrigerant from being introduced to said first evaporator (13) when a discharge pressure of said compressor (2) lowers to a level not higher than a fourth set value which is lower than the third set value, during the heating operation of said air conditioning system.

7. A heat pump type air conditioning system (A) as claimed in claim 1, wherein said circuit change-over valve (4) is set to take its first position to cause the flow of the refrigerant discharged from said compressor (2) to be changed over to said refrigeration operation refrigerant circuit when a discharge pressure of said compressor (2) rises to a level not lower than a fifth set value which is lower than a standard value to stop an operation of said compressor, and to take its second position to cause the flow of the refrigerant discharged from said compressor (2) to be changed over to said heating operation refrigerant circuit when the discharge pressure of said compressor (2) lowers to a level not higher than a sixth set value which is lower than the fifth set value, during the heating operation of said air conditioning system.

* * * * *

UNITED STATES PATENT AND TRADEMARK OFFICE
CERTIFICATE OF CORRECTION

PATENT NO. : 5,899,086
DATED : 5/4/99
INVENTOR(S) : Noda et al.

It is certified that error appears in the above-identified patent and that said Letters Patent is hereby corrected as shown below:

Column 22, line 18, before "flow" insert --second--

Column 22, line 20, before "flow" insert --second--.

Signed and Sealed this

Fourth Day of January, 2000

Attest:

Attesting Officer

*Acting Commissioner of Patents and Trademarks*